United States Patent
Hafeez et al.

(10) Patent No.: US 8,027,329 B2
(45) Date of Patent: Sep. 27, 2011

(54) PREAMBLE DESIGN FOR SYNCHRONIZATION AND CELL SEARCH

(75) Inventors: Abdulrauf Hafeez, Cary, NC (US); Jiann-Ching Guey, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1013 days.

(21) Appl. No.: 11/672,084

(22) Filed: Feb. 7, 2007

(65) Prior Publication Data

US 2008/0186949 A1  Aug. 7, 2008

(51) Int. Cl.
*H04Q 7/00* (2006.01)
(52) U.S. Cl. ......................... 370/350; 370/328
(58) Field of Classification Search .................. 370/328, 370/350; 375/260, 295, 316, 356, 362
See application file for complete search history.

(56) References Cited

U.S. PATENT DOCUMENTS

| | | | |
|---|---|---|---|
| 6,654,431 B1 | 11/2003 | Barton et al. | |
| 6,940,933 B1 * | 9/2005 | Heinonen et al. | 375/354 |
| 2004/0208267 A1 | 10/2004 | Lee | |
| 2004/0246998 A1 | 12/2004 | Ma et al. | |
| 2005/0099939 A1 * | 5/2005 | Huh et al. | 370/210 |
| 2006/0280136 A1 | 12/2006 | Sezgin et al. | |
| 2007/0025236 A1 | 2/2007 | Ma et al. | |
| 2007/0066362 A1 * | 3/2007 | Ma et al. | 455/562.1 |
| 2007/0179782 A1 * | 8/2007 | Chung et al. | 704/225 |
| 2008/0039107 A1 * | 2/2008 | Ma et al. | 455/450 |
| 2008/0043819 A1 * | 2/2008 | Li et al. | 375/142 |

FOREIGN PATENT DOCUMENTS

| | | |
|---|---|---|
| EP | 1482699 | 12/2004 |
| WO | WO2004088914 | 10/2004 |

OTHER PUBLICATIONS

G. Klang, (ed.), "Identification of radio-link technologies," IST-2003-507581, *Winner Deliverable* D2,1, Ver. 1.0, 2005, pp. 193-200.
E. Zimmerman, (ed.), "Assessment of radio-link technologies," IST-2003-507581, *Winner Deliverable* D2.3, Ver. 1.0, 2005, pp. 74-79.
H. Minn and V.K. Bhargava and K.B. Letaief, "A robust timing and frequency synchronization for OFDM systems," *IEEE Trans. Commun.*, vol. 2, No. 4, Jul. 2003, pp. 822-839.
N. Zhang and S.W. Golomb, "Sixty-phase generalized Barker sequences," *IEEE Trans. Inform. Theory*, vol. 35, No. 4, Aug. 1989, pp. 911-912.

* cited by examiner

*Primary Examiner* — Dwayne Bost
*Assistant Examiner* — Myron Wyche
(74) *Attorney, Agent, or Firm* — Coats & Bennett, P.L.L.C.

(57) ABSTRACT

A method of synchronizing signals in a wireless network uses a two part preamble transmitted on the downlink between a base station and a mobile station. The preamble includes a common pilot common to a plurality of base stations and a dedicated pilot unique to the transmitting base station. The mobile station performs coarse synchronization based on the common pilot and fine synchronization based on the dedicated pilot. The mobile station also identifies one or more nearby cells based on unique pilot tones in the dedicated pilot transmitted by the nearby cells.

58 Claims, 5 Drawing Sheets

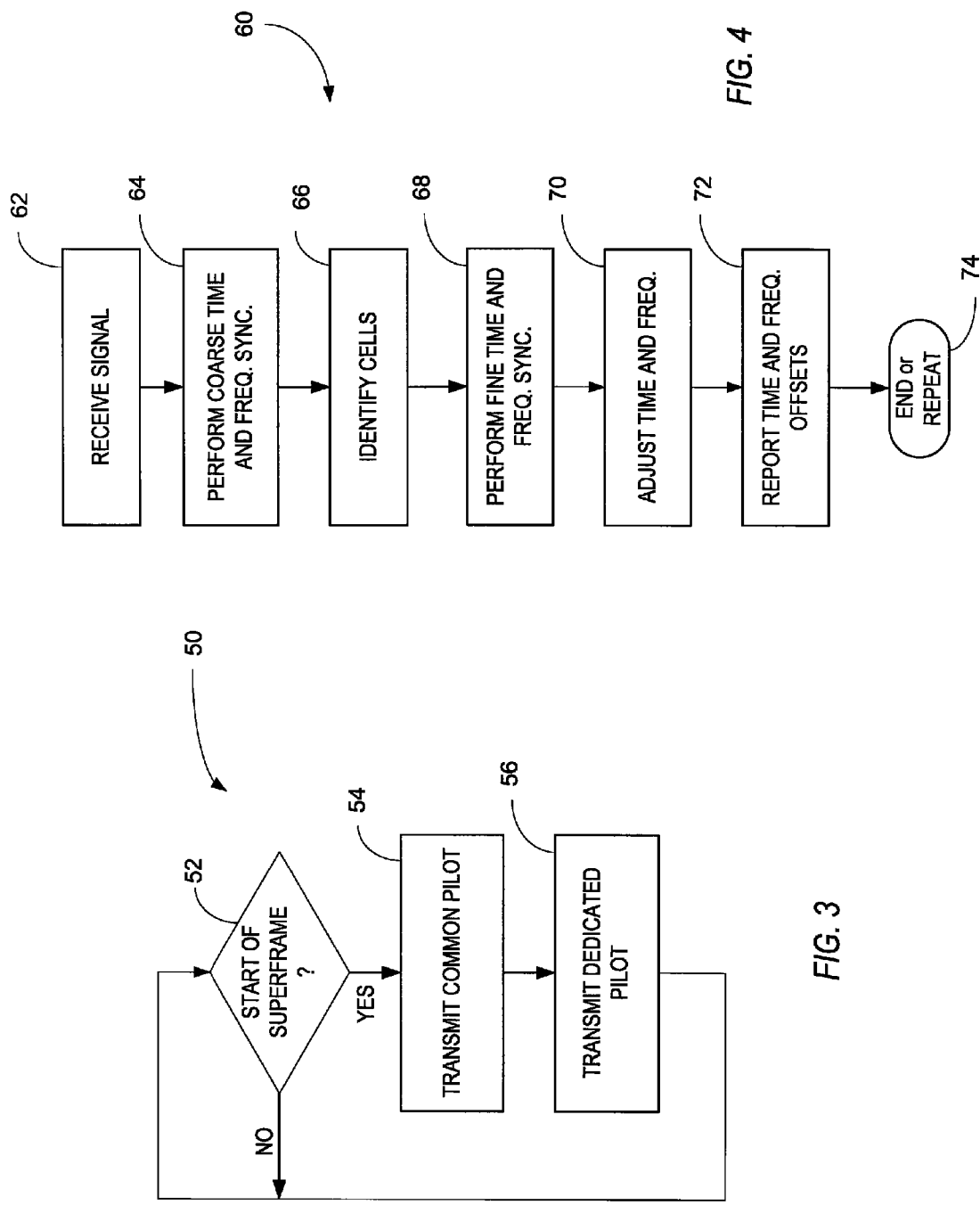

PREAMBLE DESIGN FOR SYNCHRONIZATION AND CELL SEARCH

BACKGROUND

The present invention relates generally to wireless communication systems, and more particularly to cell synchronization in mobile communication systems.

Orthogonal Frequency Division Multiplexing (OFDM) systems modulate different portions of a data stream using different frequencies to produce multiple orthogonal data streams for transmission. In so doing, the OFDM system produces a wide band radio transmission link. When multiple access systems use OFDM, each remote device transmits frequency multiplexed signals to the base station. In order to maintain orthogonality and to minimize interference, OFDM systems require that the frequency multiplexed signals from different remote devices arrive at the base station at the same time. Thus, it is important to synchronize the reception of data streams from different remote devices.

A preamble attached to a superframe provides one method of synchronizing. The preamble may be used for mobile-assisted, self-organized inter-cell synchronization without any help from base station controllers. In this case, the mobile stations use downlink signals that include the preamble to identify multiple base stations and estimate their frame timings and carrier frequency offsets. Each mobile station reports the estimates to its serving base station. Each base station corrects timing and frequency information based on the received estimates.

Conventional preambles do not currently provide sufficient synchronization for both inter-cell and intra-cell synchronization. For example, preambles designed for intra-cell synchronization may not enable the mobile station to distinguish neighboring cell signals from the signals received from the mobile station's own cell.

Another preamble may include three OFDM symbols. Each of the three OFDM symbols contains two unique pilot tones on successive carriers for each cell. This type of preamble eliminates the ambiguity between multiple strong cells, and therefore is suitable for inter-cell synchronization. However, because only two pilot tones are used for each cell, the cell detection and synchronization is highly sensitive to frequency selectivity, Further, the preamble in this example has high timing ambiguity at one symbol offset, and thus may not be used to determine frame timing.

In another example, pseudo-noise (PN) codes specific to each cell may be used to design the preamble for cell identification and coarse synchronization. Cell identification and synchronization using this type of preamble has a high degree of complexity because the mobile station must correlate the received signals against all codes for all timing hypotheses in order to detect the cells. Further, the frequency offsets due to oscillator drifts adversely affect the cross-correlation of the PN codes.

A preamble with a repeated training sequence offers another option for synchronization for WiFi systems. The repeated training sequence is detected using a periodicity metric, which provides the timing and frequency offsets in a single step. This solution is less complex and more robust to frequency offsets than the PN code solution. However, the repeated training sequence solution has very low timing resolution.

Thus, there remains a need for alternative synchronization and cell identification solutions.

SUMMARY

The present invention provides a preamble transmitted by the base stations in a mobile communication network that can be used for own-cell synchronization, cell searching and identification, and inter-cell synchronization. The preamble comprises a common pilot that is used for coarse synchronization, and a dedicated pilot that is used for cell identification and fine synchronization. The common pilot comprises a Barker-encoded repeated training sequence and the dedicated pilot comprises two OFDM symbols with densely populated pilot tones unique to each cell. A mobile station performs coarse synchronization using the common pilot and identifies one or more strong cells by detecting the unique pilot tones in the dedicated pilots transmitted from nearby base stations. The mobile station performs fine synchronization for each detected cell by observing the phase changes in the dedicated pilot tones from the base stations.

BRIEF DESCRIPTION OF THE DRAWINGS

FIG. 3 illustrates an exemplary procedure implemented by a base station for transmitting a preamble on the downlink.

FIG. 4 illustrates an exemplary procedure implemented by a mobile station for cell identification and synchronization.

DETAILED DESCRIPTION

Figure 1:
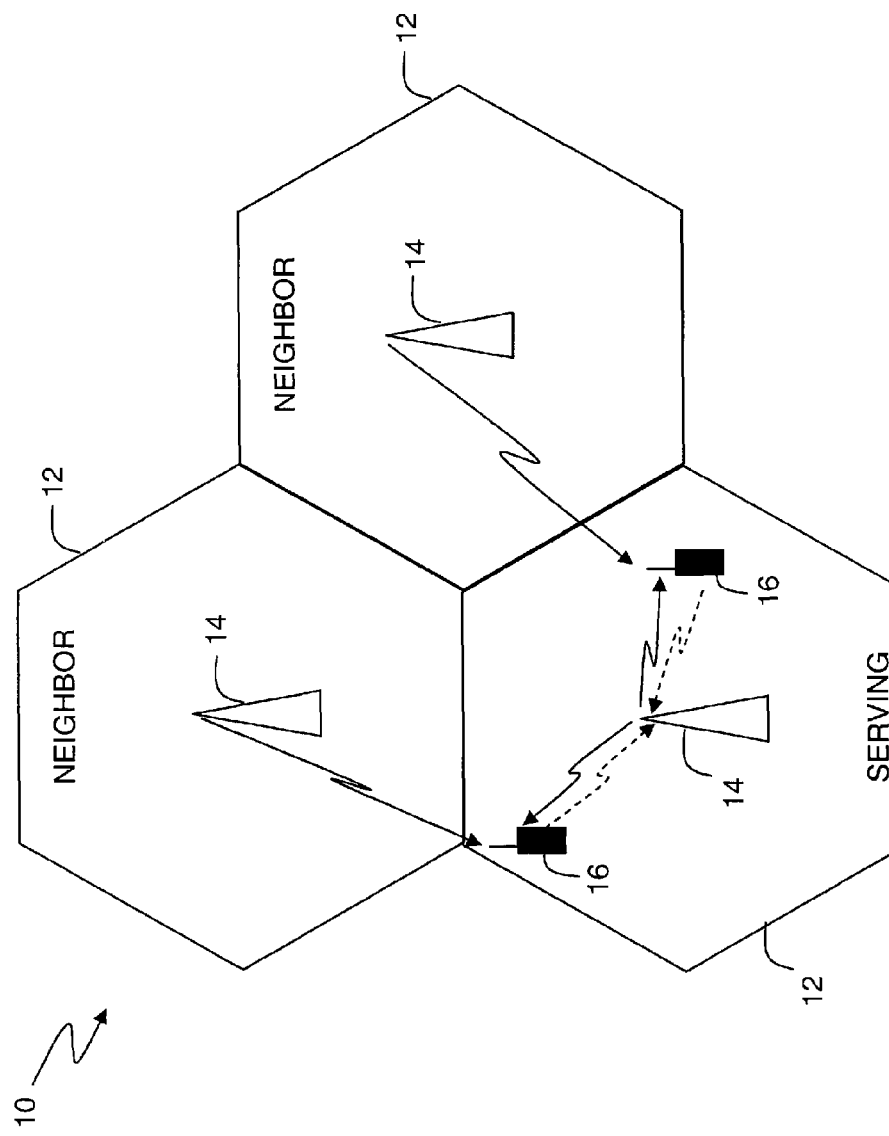
FIG. 1 illustrates a wireless communication system applicable to the present invention.

FIG. 1 illustrates an exemplary mobile communication network indicated generally by the numeral 10. The mobile communication network 10 comprises an Orthogonal Frequency Division Multiplexing (OFDM) network. The geographic area of the mobile communication network 10 is divided into cells 12. The cells 12 may be further divided into sectors. At least one base station 14 is located in each cell 12 for communicating with mobile stations 16 in the cell 12. If the cell 12 is divided into sectors, the cell 12 may include one base station for all sectors, or separate base stations 14 for each sector in the cell. To simplify the explanation of the present invention, it is assumed that each cell 12 comprises a single sector with a single base station 14. The principles described can be extended easily to multi-sector cells 12.

Transmissions on the downlink from the base station 14 are divided into frames, which are grouped into superframes. The base stations 14 transmit a preamble in each superframe for cell searching and synchronization. The downlink transmission from the base stations 14 are indicated in solid lines. The preamble transmitted on the downlink allows mobile stations 16 to detect strong signals from nearby base stations 14, and to estimate their frame timings and carrier frequency offsets. Each mobile station 16 reports these estimates to a serving base station 14, which may use the estimates for inter-cell synchronization. The uplink transmissions from the mobile stations 16 are indicated in dashed lines. The base stations 14 may use the timing and frequency estimates received from the mobile stations 16 to adjust their own timing and frequency. Thus, inter-cell synchronization can be done in a self-organized manner without intervention by any base station controllers.

Figure 2:
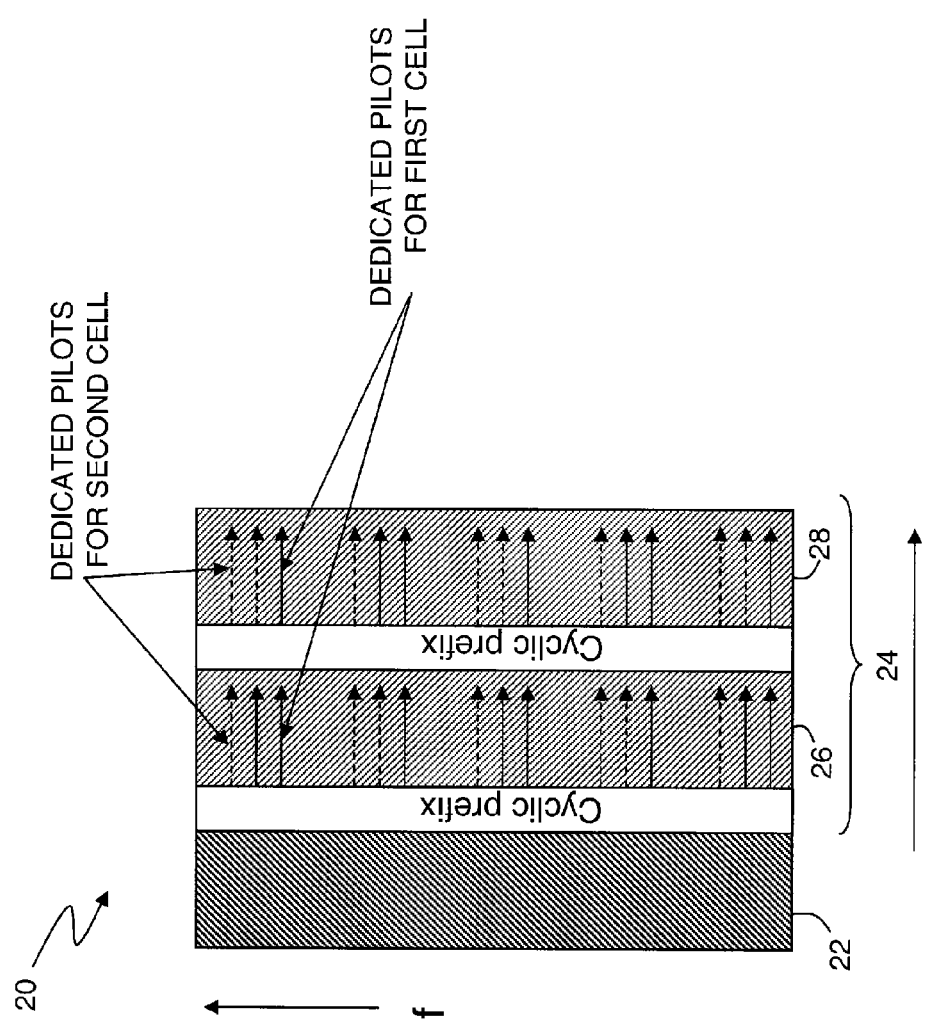
FIG. 2 illustrates one exemplary preamble according to the present invention.

FIG. 2 shows one exemplary preamble 20 designed for own-cell synchronization, cell searching and identification, and inter-cell synchronization. The preamble 20 comprises two parts: a common pilot that is used for coarse synchronization and a dedicated pilot that is used for cell identification and fine synchronization. The common pilot comprises a Barker-encoded repeated training sequence and the dedicated pilot comprises two OFDM symbols with densely populated pilot tones unique to each cell 12. A mobile station 16 performs coarse synchronization using the common pilot 22 and identifies one or more strong cells 12 by detecting the unique pilot tones in the dedicated pilots 24 transmitted from nearby base stations 14. The mobile station 16 performs fine synchronization for each detected cell 12 by observing the phase changes in the dedicated pilot tones from the base stations 14.

The repeated training sequence of the common pilot 22 comprises a time block, having length M, that is repeated L times. The repeated training sequence may be generated by inserting a pilot tone every L successive subcarriers in an OFDM symbol of length $N_c$, where L represents the pilot spacing, and taking the inverse fast Fourier transform (IFFT) of the OFDM symbol. The resulting repeated training sequence has a length of $N_c=LM$, where M represents the number of inserted pilot tones. In some embodiments, the inserted pilot tones may be randomly or pseudo-randomly phase-modulated before taking the IFFT to make each block different for different cells. The common pilot is then generated by multiplying the phase modulated OFDM symbol (or just the OFDM symbol) by a length-L differential generalized Barker sequence that is common to all cells. A generalized Barker sequence is a sequence of unit-amplitude complex numbers having a non-zero lag autocorrelation amplitude less than or equal to 1. A length-L differential generalized Barker sequence may be obtained from a generalized Barker sequence having length L-1, as discussed in "Sixty-phase generalized Barker sequences" by N. Zhang and S. W. Golomb in IEEE Trans. Inform. Theory, vol. 35, no. 4, pp. 911-912, August 1989, which is herein incorporated by reference.

The dedicated pilot 24 comprises two successive OFDM symbols 26, 28 having a FFT (Fast Fourier Transform) size of $N_d$ and a cyclic prefix size of $N_{cp}$. The OFDM symbols 26, 28 carry unique pilot tones for each cell in an alternating pattern, as shown by the solid and dashed lines in FIG. 2. The reasons for employing the alternating pattern will become readily apparent in light of the cell identification method discussed further below.

To perform synchronization, the preamble 20 must have sufficient timing and frequency offset robustness. The common pilot 22 is designed to be robust to delay spreads of up to M/W seconds and frequency offsets of up to W/(2M) Hz, where W represents the signal bandwidth. The timing resolution of the common pilot 22 is therefore M/W seconds, with a peak-to-sidelobe ratio of $P_S=20 \, Log_{10}(L)$. The dedicated pilot 24 is robust to delay spreads of up to $N_d/(WS_p)$ seconds, where $S_p$ is the pilot spacing in the dedicated pilot. The dedicated pilot 24 enables $2 S_p/3$ cells to be identified with a fine frequency resolution of $W/(2N_d)$ Hz.

The common pilot 22 has one dimension common to all cells. The dedicated pilot 24 has ⅔ $S_p$ unique dimensions for identifying different cells, where the ⅔ factor is due to the alternating pilot pattern. When the number of cells to be identified is fixed, the size of the dedicated pilot $N_d$ may be increased to make the dedicated pilot 24 more robust to frequency selectivity. It will be appreciated that increasing $N_d$ increases the preamble overhead and decreases the robustness to frequency offset. Alternatively, the size of the dedicated pilot $N_d$ may be decreased to make the dedicated pilot 24 more robust to frequency offsets and to reduce the preamble overhead.

Consider an example where the preamble 20 is designed to identify $N_{bs}$ cells and has a guard time $T_g$ and a desired peak-to-sidelobe ratio $P_s$. A preamble 20 that satisfies these constraints has the following characteristics:

$$M \geq \frac{WT_g}{C_c} \quad (1)$$

$$L \geq 10^{P_s/20}$$

$$S_p \geq \frac{3N_{bs}}{2}$$

$$N_d \geq \frac{WT_g S_p}{C_d},$$

where $C_c \geq 1$ and $C_d \geq 1$ represent design parameters that enable a tradeoff between frequency offset robustness (as well as low preamble overhead) and frequency selectivity robustness for the common and dedicated pilots, respectively. When $C_c$ and/or $C_d$ equal 1, the robustness of the frequency selectivity is at a maximum. As $C_c$ and/or $C_d$ increase, the robustness of the frequency selectivity decreases while the robustness of the frequency offset increases.

For this example, assume W=20 MHz, $T_g$=3.2 μsec, $N_{bs}$=64, $P_s$=30 dB, $C_c$=2, $C_d$=3, and $N_{fft}$=512, where $N_{fft}$ represents the size of the fast Fourier transform (FFT) of the data symbols. In this case, the preamble 20 may be designed such that M=32, L=32, $S_p$=96, $N_c$=LM=1024, and $N_d$=2048. The resulting common pilot 22 is robust to delay spreads of up to 1.6 μsec and frequency offsets of up to $8f_{sub}$ Hz, where $f_{sub}$ is the subcarrier spacing for data symbols. The resulting dedicated pilot 24 is robust to delay spreads of up to 1.067 μsec and frequency offsets of up to $f_{sub}/8$ Hz. If $C_d$=6, $N_d$=1024 and the dedicated pilot 24 is robust to delay spreads of up to 0.533 μsec and frequency offsets of up to $f_{sub}/4$ Hz. It will be appreciated that the frequency offsets are much larger for mobile stations than for base stations. Thus, common pilot 22 may be used to remove a large carrier frequency offset, which is common to all received signals and is present in all signals received at the mobile station. Further, dedicated pilot 24 may be used to remove much smaller frequency offsets caused by individual base stations. As a result, the dedicated pilot 24 does not have to be as robust to frequency offsets as the common pilot 22.

FIG. 3 illustrates a method 50 implemented at a base station 14 for transmitting the preamble 20. The base station 14 detects the start of a superframe (block 52). When the start of a superframe is detected, the base station 14 generates and transmits the common pilot (block 54), then generates and transmits the dedicated pilot (block 56). The process repeats each time a superframe is detected (block 52).

A mobile station 16 may process received signals containing the preamble 20 described above to detect cells 12 and to estimate the corresponding timing and frequency offsets of the cells 12. The mobile station 16 processes the common pilot 22 of a received preamble 20 to perform coarse synchronization, and processes the dedicated pilot 24 of the received preamble 20 to perform cell identification and fine synchronization. In some embodiments, the mobile station 16 may also estimate the frequency offsets for detected cells 12. Each mobile station 16 reports the timing and/or frequency estimates to its serving base station 14. The base stations 14 correct their timing and frequency information based on the received estimates.

FIG. 4 illustrates a procedure 60 performed by the mobile station 16 to process received signals to achieve synchronization. The mobile station 16 receives a signal from one or more nearby base stations 14 (block 62) and performs coarse time and frequency synchronization using the common pilot 22 (block 64). Thereafter, the mobile station 16 identifies one or more cells 12 by detecting the unique pilot tones in the dedicated pilot 24 (block 66). The mobile station 16 may select one or more cells 12 and perform fine synchronization for the selected cells (block 68). The mobile station 16 may then adjust its own timing and frequency to synchronize with the serving base station 14 (block 70). The mobile station 16 may also report the time and frequency offsets for one or more neighbor base stations to the serving base station 14 (block 72). The process then ends or repeats, e.g., every superframe (block 74).

Figures 5, 6:
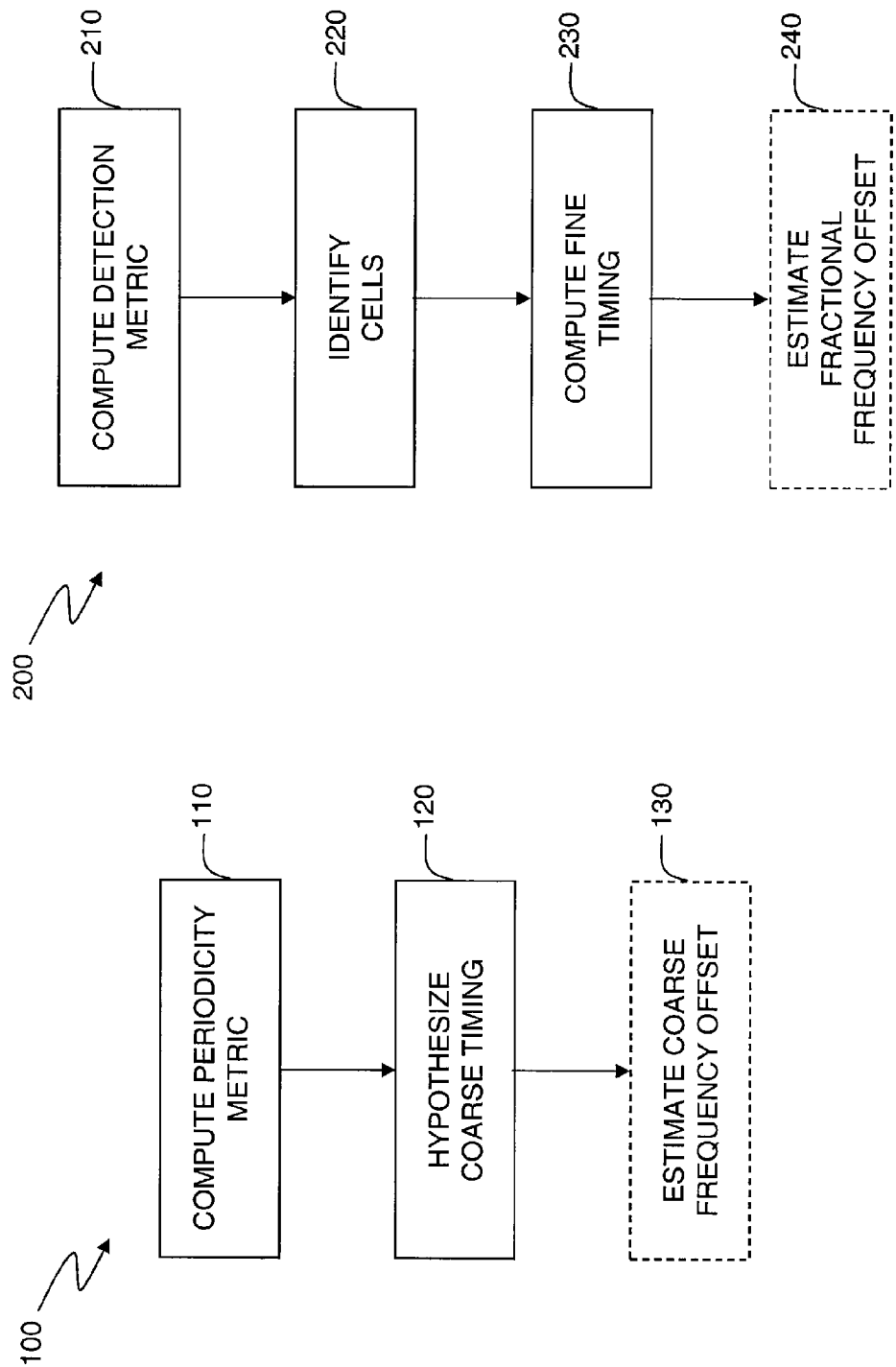
FIG. 5 illustrates an exemplary procedure for coarse synchronization implemented by a mobile station.
FIG. 6 illustrates an exemplary procedure for fine synchronization and cell identification implemented by a mobile station.

FIG. 5 shows one exemplary coarse synchronization process 100 that uses the common pilot 22 of a received signal. Generally, mobile station 16 computes a periodicity metric $\Lambda(n)$ based on the received signal (block 110) and identifies the coarse timing hypotheses $\hat{n}$ that maximize the periodicity metric (block 120). For each coarse timing hypothesis $\hat{n}$, the mobile station 16 estimates a coarse frequency offset $\hat{f}$ (block 130).

Mobile station 16 may compute the periodicity metric $\Lambda(n)$ (block 110) according to:

$$\Lambda(n) = \frac{|P(n)|}{E(n)}, \tag{2}$$

where $E(n)$ represents the power of the received signal and may be given by:

$$E(n) = \sum_{k=0}^{L-1} \sum_{m=0}^{M-1} |r(n + kM + m)|^2, \tag{3}$$

and $P(n)$ represents an autocorrelation corresponding to the received signal and may be given by:

$$P(n) = \sum_{k=0}^{L-2} d(k) \sum_{m=0}^{M-1} r^*(n + kM + m)r(n + (k+1)M + m). \tag{4}$$

In Equations (3) and (4), $r(n)$ represents the $n^{th}$ chip of the received signal sampled at the chip rate and $d(k)$ represents the differential generalized Barker sequence. The received signal $r(n)$ includes the common pilot 22 and the dedicated pilot 24 of the preamble 20 described above. The differential Barker sequence $d(k)$ may be given by:

$$d(k) = b(k)b^*(k-1), \tag{5}$$

where $b(k)$ for $k=0, 1, \ldots, L-1$ represents the generalized Barker sequence and $b(-1)$ is arbitrarily set to 1.

To hypothesize the coarse timing estimates $\hat{n}$ (block 120), mobile station 16 selects the coarse timing estimates $\hat{n}$ that maximize the periodicity metric $\Lambda(n)$. To ensure that each coarse timing estimate $\hat{n}$ corresponds to a different cell 12, the mobile station 16 selects $K_1$ timing estimates $\hat{n}$, where the selected timing estimates are at least M samples apart. For each selected coarse timing estimate $\hat{n}$, the mobile station 16 may also optionally estimate the coarse frequency offset $\hat{f}$ (block 130) according to:

$$\hat{f} = \frac{\angle P(\hat{n})}{2\pi M} W, \tag{6}$$

where $\angle P(\hat{n})$ represents the phase of $P(\hat{n})$ in radians.

FIG. 6 shows one exemplary process 200 that uses the dedicated pilot 24 of a received signal to perform cell identification and fine synchronization. For each of $K_1$ timing estimates, the mobile station 16 determines a detection metric $\Gamma(j)$ for each cell 12 based on the dedicated pilot 24 (block 210) and identifies the strongest cells as those cells 12 that maximize the detection metric (block 220). The mobile station 16 then computes the fine timing estimate $t(j)$ for each identified cell 12 based on the dedicated pilot 24 (block 230). The mobile station 16 may also optionally estimate the fractional frequency offset $\tilde{f}(j)$ (block 240).

To compute the detection metric $\Gamma(j)$ (block 210), the mobile station 16 first computes the FFT of the two OFDM symbols 26, 28 in the dedicated pilot 24 according to:

$$R_1 = FFT\left[r\left(\hat{n} + LM + \frac{N_{cp}}{2} + 1\right),\right. \tag{7}$$

$$\left. r\left(\hat{n} + LM + \frac{N_{cp}}{2} + 2\right), \ldots, r\left(\hat{n} + LM + \frac{N_{cp}}{2} + N_d\right)\right]$$

$$R_2 = FFT\left[r\left(\hat{n} + LM + \frac{3N_{cp}}{2} + N_d + 1\right),\right.$$

$$\left. r\left(\hat{n} + LM + \frac{3N_{cp}}{2} + N_d + 2\right), \ldots, r\left(\hat{n} + LM + \frac{3N_{cp}}{2} + 2N_d\right)\right].$$

The mobile station 16 then computes the detection metric $\Gamma(j)$ (block 210) for the $j^{th}$ cell according to:

$$\Gamma(j) = 10\log_{10}\left(\sum_{i \in I_1(j)} |R_1(i)|^2 + \sum_{i \in I_2(j)} |R_2(i)|^2\right), \tag{8}$$

where $I_k(j)$ represents the set of indices of the pilot tones in the $k^{th}$ symbol belonging to the $j^{th}$ cell. Equation (8) shows that the detection metric $\Gamma(j)$ represents the cumulative energy in all pilot tones belonging to the $j^{th}$ cell. Mobile station 16 selects the strongest $K_2$ cells that maximize the detection metric $\Gamma(j)$. Based on the $K_1$ coarse timing hypotheses and the $K_2$ cell hypotheses, the mobile station 16 identifies K cells out of $K_1 K_2$ possible cell hypotheses.

For each identified cell 12, the mobile station 16 computes the fine timing estimate $t(j)$ (block 230). To that end, mobile station 16 computes the fractional residual timing estimate $\tilde{n}(j)$ according to:

$$\tilde{n}(j) = \text{round} \tag{9}$$

$$\left[\left(\frac{N_d}{2\pi}\left(\sum_{i \in I'_1(j)} w'_1(i)\angle(R_1(i+1)R_1^*(i)) + \sum_{i \in I'_2(j)} w'_2(i)\angle(R_2(i+1)R_2^*(i))\right) + \frac{N_{cp}}{2}\right)\right],$$

where I'$_k$(j) represents the set of indices of pilot tones in symbol k belonging to the j$^{th}$ cell that have a pilot tone in the successive subcarrier, and where w'$_k$(i) represent weights given by:

$$w'_k(i) = \frac{|R_k(i+1)R_k^*(i)|}{\sum_{i \in I'_1(j)} |R_1(i+1)R_1^*(i)| + \sum_{i \in I'_2(j)} |R_2(i+1)R_2^*(i)|}. \quad (10)$$

As shown in Equation (9), the fractional timing estimate ñ(j) is computed based on the weighted sum of the phase difference between all pilot tones belonging to the j$^{th}$ cell in successive subcarriers of the two OFDM symbols 26, 28 in the dedicated pilot 24. Mobile station 16 then computes the fine timing estimate t(j) for each cell 12 (block 230) according to:

$$t(j) = \hat{n} - \tilde{n}(j). \quad (11)$$

The mobile station 16 may optionally compute the fractional frequency offset f̃(j) for each identified cell 12 (block 240) as the weighted sum of the phase differences between all pilot tones belonging to the j$^{th}$ cell in the same subcarrier of the two symbols 26, 28. Equation (12) shows one way to compute the fractional frequency offset f̃(j).

$$\tilde{f}(j) = \frac{W}{2\pi(N_d + N_{cp})} \sum_{i \in I''(j)} w''(i) \angle (R_2(i)R_1^*(i)) \quad (12)$$

where I''(j) represents the set of indices of the pilot tones belonging to the j$^{th}$ cell in both symbols 26, 28 of the dedicated pilot 24, and w''(i) represents weights given by:

$$w''(i) = \frac{|R_2(i)R_1^*(i)|}{\sum_{i \in I''(j)} |R_2(i)R_1^*(i)|} \quad (13)$$

When $$\hat{f} < \frac{W}{2N_d},$$

the fine frequency offset f(j) equals the fractional frequency offset f̃(j). When $$\hat{f} > \frac{W}{2N_d},$$

then the mobile stations 16 compensates for the coarse frequency offset f̂ in the received signal r(n) before computing $R_1$ and $R_2$ according to Equation (7), and then computes the fine frequency offset f(j) according to:

$$f(j) = \hat{f} + \tilde{f}(j). \quad (14)$$

The above-described synchronization and cell identification may be used for intra-cell (own-cell) synchronization. More particularly, mobile station 16 may smooth the detection metric Γ$_j$(h), fine timing estimate t$_j$(h), and the fine frequency offset f$_j$(h) computed for the h$^{th}$ superframe belonging to the j$^{th}$ cell to determine a smoothed detection metric Γ'$_j$(h) and a smoothed frequency offset f'$_j$(h) for each cell 12. Equation (15) provides one exemplary way to compute the smoothed detection metric Γ'$_j$(h) and smoothed frequency offset f'$_j$(h).

$$\Gamma'_j(h) = (1-\mu_\Gamma)\Gamma'_j(h-1) + \mu_\Gamma \Gamma_j(h)$$

$$f'_j(h) = (1-\mu_f)f'_j(h-1) + \mu_f f_j(h), \quad (15)$$

In Equation (15), $\mu_\Gamma$ and $\mu_f$ are poles of smoothing filters. The initial values of the smoothed detection metric Γ'$_j$(h) and smoothed frequency offset f'$_j$(h) may be set equal to the detection metric Γ$_j$(1) and frequency offset value f$_1$(1) computed for the first superframe. Mobile station 16 identifies the cell 12 having the largest smoothed detection metric Γ'$_j$(h) as its serving cell 12. Accordingly, the mobile station 16 adjusts its local oscillator based on the smoothed frequency offset f'$_j$(h) of the identified serving cell 12.

The above-described synchronization and cell identification may also be used for inter-cell synchronization and identification. More particularly, each mobile station 16 computes and reports the differences in the smoothed detection metric ΔΓ', fine timing Δt', and fine frequency offset Δf' of the neighboring cells 12 with respect to its serving cell 12. For example, if cell j represents the mobile station's serving cell 12 and if cell k represents the second strongest cell 12, the difference values for the h$^{th}$ superframe may be computed according to:

$$\Delta\Gamma'_{j,k}(h) = \Gamma'_j(h) - \Gamma'_k(h)$$

$$\Delta t'_{j,k}(h) = t'_j(h) - t'_k(h)$$

$$\Delta f'_{j,k}(h) = f'_j(h) - f'_k(h) \quad (16)$$

Each base station 14 uses the received difference values to synchronize its timing to the timing of neighboring base stations 14. For example, let A$_j$(h) represent the set of all neighboring cells 12 that satisfy ΔΓ'$_{j,k}$(h)<T$_m$, where T$_m$ represents a chosen threshold. The set A$_j$(h) therefore comprises all cells 12 having a base station 14 that transmits sufficiently strong signals. The cells 12 in the set A$_j$(h) are considered to provide reliable synchronization estimates. The serving base station 14 computes its frame timing and carrier frequency offset for the h$^{th}$ superframe according to:

$$t_j^\circ(h) = t_j^\circ(h-1) + \mu_{t^\circ} E\Delta t_j(h)$$

$$f_j^\circ(h) = f_j^\circ(h-1) + \mu_{f^\circ} E\Delta f_j(h) \quad (17)$$

where $\mu_{t^\circ}$ and $\mu_{f^\circ}$ represent poles of smoothing filters, and where EΔt$_j$ and EΔf$_j$ represent the mean time and frequency differences, respectively, given by:

$$E\Delta t_j(h) = \frac{1}{N_j(h)} \sum_{k \in A_j(h)} \Delta t_{j,k}(h) w_{j,k}(h) \quad (18)$$

$$E\Delta f_j(h) = \frac{1}{N_j(h)} \sum_{k \in A_j(h)} \Delta f_{j,k}(h) w_{j,k}(h)$$

In Equation (18), N$_j$(h) represents the size of the set A$_j$(h) and W$_{j,k}$(h) represents the weight or reliability of each timing and frequency offset estimate, which may be computed according to:

$$w_{j,k}(h) = \frac{10^{\Delta\Gamma'_{l,k}(h)/10}}{\sum_{k \in A_j(h)} 10^{\Delta\Gamma'_{j,k}(h)/10}}. \quad (19)$$

Inter-cell synchronization may have two phases: an acquisition phase and a tracking phase. During the acquisition phase, parameters need to rapidly adapt. Therefore, during the acquisition phase, the base station 14 uses large values for the smoothing poles $\mu_{t^\circ}$ and $\mu_{f^\circ}$. During the tracking phase, parameters have already been acquired and therefore do not need to rapidly adapt. Therefore, during the tracking phase, the base station 14 uses small values for the smoothing poles $\mu_{t^\circ}$ and $\mu_{f^\circ}$.

The base station 14 may use a timing variance to distinguish between the two phases. For example, the serving base station 14 may compute a timing error $V\Delta t_j(h)$ and a frequency error $V\Delta f_j(h)$ for the $h^{th}$ superframe of the serving base station 14 according to:

$$V\Delta t_j(h) = \frac{1}{N_j(h)} \sum_{k \in A_j(h)} \Delta t_{j,k}^2(h) w_{j,k}(h) - (E\Delta t_j(h))^2 \quad (20)$$

$$V\Delta f_j(h) = \frac{1}{N_j(h)} \sum_{k \in A_j(h)} \Delta f_{j,k}^2(h) w_{j,k}(h) - (E\Delta f_j(h))^2.$$

When Equation (21) is satisfied, where $T_t$ is a timing threshold, the timing of the serving based station 14 is in the acquisition phase. Otherwise the timing of the serving base station 14 is in the tracking phase.

$$V\Delta t_j(h) > T_t \text{ or } N_j(h) = 1 \quad (21)$$

When Equation (22) is satisfied, where $T_f$ is a frequency threshold, the frequency of the serving based station 14 is in the acquisition phase. Otherwise the frequency of the serving base station 14 is in the tracking phase.

$$V\Delta f_j(h) > T_f \text{ or } N_j(h) = 1 \quad (22)$$

Figure 7:
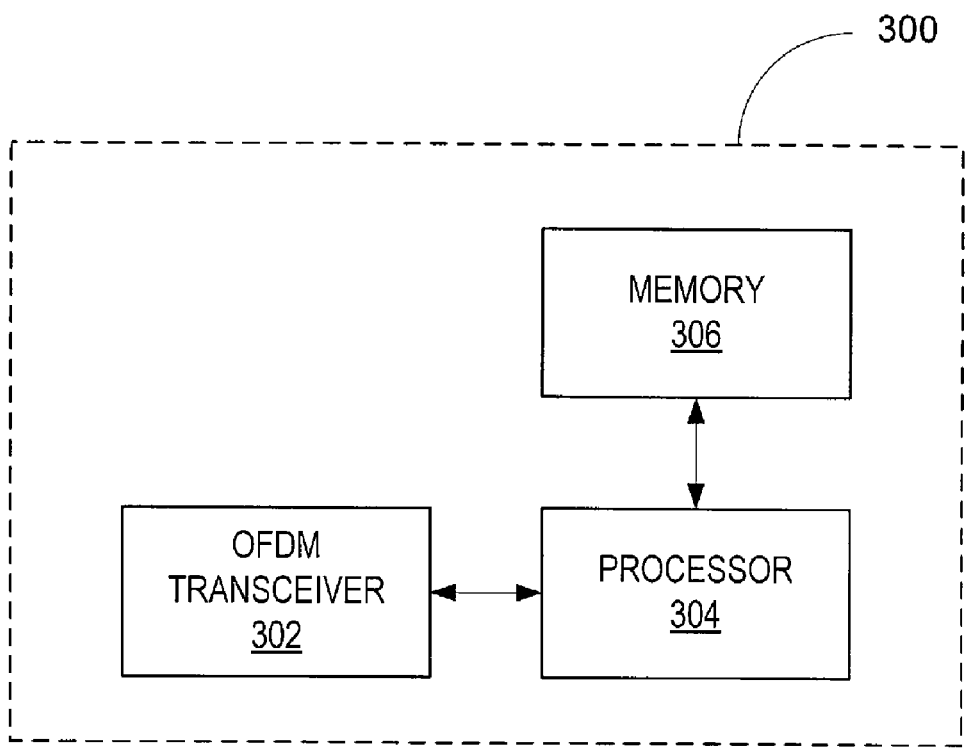
FIG. 7 illustrates an exemplary wireless communication device according to the present invention.

FIG. 7 shows a block diagram of an exemplary wireless communication device 300 that may be used to implement the synchronization and cell identification process of the present invention. It will be appreciated that the illustrated wireless communication device 300 may comprise a base station 14 or a mobile station 16. Communication device 300 includes a communication interface 302, processor 304, and memory 306. Communication interface 302 may comprise any known wireless interface that transmits and receives wireless signals according to any known standard using OFDM. Processor 304 controls the operation of the communication device 100 according to programs stored in memory 306. In addition, processor 304 implements the above described synchronization and cell identification processes. It is possible to smooth timing and frequency offset estimates of other cells. Smoothed estimates of other cells, which are more reliable than instantaneous estimates, can be used to improve inter-cell synchronization.

The above describes the invention in terms of a mobile station 16 that determines timing, frequency offset, and identification information associated one or more base stations 16. It will be appreciated that the mobile station 16 may also use the above-described technique to determine identification information associated with other mobile stations 16.

Further, it will be appreciated that channel estimation pilots may be used along with preamble 20 to further improve the synchronization and cell identification processes. In addition, while the above describes the synchronization and cell identification processes in terms of the common and dedicated pilots, it will be appreciated that channel estimation pilots may be used with the common pilot 22 in place of the dedicated pilot 24.

Preamble 20 provides new and improved means for cell identification, intra-cell synchronization, and inter-cell synchronization that is simple and frequency diverse. More particularly, the preamble 20 may be used for inter-cell synchronization, and therefore is an improvement over traditional preambles. Further, preamble 20 is frequency diverse, and therefore does not suffer from frequency selectivity. Further still, the preamble 20 uses a common code to search for the coarse timing of all cells, and therefore has less complexity than a multi-code PN solution. Lastly, the Barker-encoded repeated training sequence associated with preamble 20 has a higher timing resolution than conventional repeated training sequence used for WiFi. Thus, the preamble 20 of the present invention provides an improved solution over the prior art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of synchronizing signals in a wireless network, the method comprising:
   receiving a signal from a transmitting base station, said signal including a preamble having a common pilot common to a plurality of base stations and a dedicated pilot unique to the transmitting base station;
   performing coarse synchronization based on the common pilot to determine a coarse timing estimate and a coarse frequency offset for the transmitting base station; and
   performing fine synchronization based on the dedicated pilot to determine a fine timing estimate for the transmitting base station.

2. The method of claim 1 wherein performing coarse synchronization comprises:
   computing a periodicity metric based on the common pilot; and
   determining the coarse timing estimate based on the periodicity metric.

3. The method of claim 2 wherein computing the periodicity metric comprises:
   correlating the received signal with itself and with a known coding sequence associated with the common pilot to determine a correlation; and
   computing the periodicity metric based on the correlation.

4. The method of claim 2 wherein determining the coarse timing estimate comprises identifying one or more coarse timing estimates that maximize the periodicity metric.

5. The method of claim 1 wherein performing fine synchronization comprises:
   computing a fractional timing estimate based on the dedicated pilot; and
   determining the fine timing estimate based on the fractional timing estimate and the coarse timing estimate.

6. The method of claim 5 wherein computing the fractional timing estimate comprises:
   determining phase differences between pilot tones in the dedicated pilot; and
   computing the fractional timing estimate based on the determined phase differences.

7. The method of claim 5 wherein determining the fine timing estimate comprises adjusting the coarse timing estimate based on the fractional timing estimate.

8. The method of claim 1 wherein computing the coarse frequency offset comprises:
   correlating the received signal with itself and with a known coding sequence associated with the common pilot to determine a correlation;
   determining a phase of the correlation; and
   computing the coarse frequency offset based on the phase of the correlation.

9. The method of claim 1 further comprising computing a fine frequency offset based on the dedicated pilot.

10. The method of claim 9 wherein computing the fine frequency offset comprises:
    computing a fractional frequency offset based on the dedicated pilot; and
    determining the fine frequency offset based on the fractional frequency offset.

11. The method of claim 10 wherein computing the fractional frequency offset comprises:
    determining phase differences between pilot tones in the dedicated pilot having the same carrier frequency; and
    computing the fractional frequency offset based on the determined phase differences.

12. The method of claim 10 wherein determining the fine frequency offset comprises adjusting the coarse frequency offset using the fractional frequency offset.

13. The method of claim 12 further comprising adjusting a frequency of the mobile station based on one of the coarse and fine frequency offsets associated with a serving base station.

14. The method of claim 12 further comprising reporting one of the coarse frequency offset and the fine frequency offset for one or more neighboring base stations to a serving base station.

15. The method of claim 1 further comprising reporting one of the coarse timing estimate, the coarse frequency estimate, and the fine timing estimate for one or more neighboring base stations to a serving base station.

16. The method of claim 1 further comprising identifying a base station based on pilot tones in the dedicated pilot.

17. The method of claim 16 wherein identifying the base station based on pilot tones in the dedicated pilot comprises:
    determining a detection metric for each of one or more base stations based on the dedicated pilot of the signals received from each base station; and
    selecting the base station having a maximum detection metric as a serving base station for the mobile station.

18. The method of claim 17 further comprising:
    smoothing the detection metric for each of the one or more base stations; and
    selecting the serving base station based on the smoothed detection metric.

19. The method of claim 18 further comprising:
    determining a fine frequency offset based on the dedicated pilot;
    smoothing the fine frequency offset; and
    adjusting a frequency of the mobile station based on the smoothed fine frequency offset.

20. The method of claim 17 further comprising identifying one or more neighboring base stations based on the detection metrics.

21. A mobile station in a wireless network for receiving signals from one or more base stations, the mobile station comprising:
    a transceiver to receive a signal from a transmitting base station, wherein said received signal includes a preamble having a common pilot common to a plurality of base stations and a dedicated pilot unique to the transmitting base station; and
    a processor configured to:
    determine a coarse timing estimate and a coarse frequency offset for the transmitting base station based on the common pilot; and
    determine a fine timing estimate for the transmitting base station based on the dedicated pilot.

22. The mobile station of claim 21 wherein the processor is configured to determine the coarse timing estimate by:
    computing a periodicity metric based on the common pilot; and
    determining the coarse timing estimate based on the periodicity metric.

23. The mobile station of claim 22 wherein the processor is configured to compute the periodicity metric by:
    correlating the received signal with itself and with a known coding sequence associated with the common pilot to determined a correlation; and
    computing the periodicity metric based on the correlation.

24. The mobile station of claim 22 wherein the processor is configured to determine the coarse timing estimate by identifying one or more coarse timing estimates that maximize the periodicity metric.

25. The mobile station of claim 21 wherein the processor is configured to determine the fine timing estimate by:
    computing a fractional timing estimate based on the dedicated pilot; and
    determining the fine timing estimate based on the fractional timing estimate and the coarse timing estimate.

26. The mobile station of claim 25 wherein the processor is configured to compute the fractional timing estimate by:
    determining phase differences between pilot tones in the dedicated pilot; and
    computing the fractional timing estimate based on the determined phase differences.

27. The mobile station of claim 25 wherein the processor is configured to determine the fine timing estimate by adjusting the coarse timing estimate based on the fractional timing estimate.

28. The mobile station of claim 21 wherein the processor is configured to compute the coarse frequency offset by:
    correlating the received signal with itself and with a known coding sequence associated with the common pilot to determined a correlation;
    determining a phase of the correlation; and
    computing the coarse frequency offset based on the phase of the correlation.

29. The mobile station of claim 21 wherein the processor is further configured to compute a fine frequency offset based on the dedicated pilot.

30. The mobile station of claim 29 wherein the processor is configured to compute the fine frequency offset by:
    computing the fractional frequency offset based on the dedicated pilot; and
    determining the fine frequency offset based on the fractional frequency offset.

31. The mobile station of claim 30 wherein the processor is configured to compute the fractional frequency offset by:
    determining the phase differences between pilot tones in the dedicated pilot having the same carrier frequency; and
    computing the fractional frequency offset based on the determined phase differences.

32. The mobile station of claim 30 wherein the processor is configured to determine the fine frequency offset by adjusting the coarse frequency offset using the fractional frequency offset.

33. The mobile station of claim 32 wherein the processor is further configured to adjust a frequency of the mobile station based on one of the coarse and fine frequency offsets associated with a serving base station.

34. The mobile station of claim 30 wherein the processor is further configured to report one of the coarse frequency offset and the fine frequency offset for one or more neighboring base stations to a serving base station.

35. The mobile station of claim 21 wherein the processor is further configured to report one of the coarse timing estimate and the fine timing estimate for one or more neighboring base stations to a serving base station.

36. The mobile station of claim 21 wherein the processor is further configured to identify a base station based on pilot tones in the dedicated pilot.

37. The mobile station of claim 36 wherein the processor is configured to identify the base station based on pilot tones in the dedicated pilot by:
 determining a detection metric for each of one or more base stations based on the dedicated pilot of the signals received from each base station; and
 selecting the base station having a maximum detection metric as a serving base station for the mobile station.

38. The mobile station of claim 37 wherein the processor is further configured to:
 smooth the detection metric for each of the one or more base stations; and
 select the serving base station based on the smoothed detection metric.

39. The mobile station of claim 38 wherein the processor is further configured to:
 determine a fine frequency offset based on the dedicated pilot;
 smooth the fine frequency offset; and
 adjust a frequency of the mobile station based on the smoothed fine frequency offset.

40. The mobile station of claim 37 wherein the processor is further configured to identify one or more neighboring base stations based on the detection metrics.

41. A synchronization method for a wireless network, the method comprising:
 transmitting a common pilot as a first part of a preamble transmitted with a signal from a base station to a mobile station in said wireless network, said common pilot common to a plurality of base stations in the wireless network;
 transmitting a dedicated pilot as a second part of said preamble, said dedicated pilot unique to the base station transmitting the signal; and
 receiving synchronization data derived by said mobile station based on said transmitted preamble, wherein said synchronization data comprises a fine timing estimate derived from said dedicated pilot, and a coarse timing estimate and a coarse frequency estimate derived from said common pilot.

42. The method of claim 41 wherein the common pilot comprises a Barker-encoded repeated training sequence.

43. The method of claim 42 wherein the Barker-encoded repeated training sequence includes a plurality of evenly spaced pilot tones.

44. The method of claim 43 further comprising randomly phase modulating the pilot tones in the common pilot.

45. The method of claim 41 wherein the dedicated pilot includes a set of pilot tones unique to the base station transmitting the signal.

46. The method of claim 45 wherein the dedicated pilot includes two symbols, wherein the set of pilot tones are distributed across the two symbols according to an alternating pattern.

47. The method of claim 46 wherein the set of pilot tones comprises multiple pairs of adjacent pilot tones and multiple single pilot tones alternately spaced within each symbol.

48. The method of claim 41 wherein the signal comprises an OFDM signal.

49. A base station in a wireless network, the base station comprising:
 a processor configured to generate a preamble for the signal, said preamble comprising a common pilot comprising a symbol common to a plurality of base stations in the wireless network and a dedicated pilot unique to the base station transmitting the signal;
 a transceiver to transmit the preamble with the signal to the mobile station and to receive synchronization data derived by said mobile station based on said transmitted preamble, wherein said synchronization data comprises a fine timing estimate derived from said dedicated pilot, and a coarse timing estimate and a coarse frequency estimate derived from said common pilot.

50. The base station of claim 49 wherein the common pilot comprises a Barker-encoded repeated training sequence.

51. The base station of claim 50 wherein the Barker-encoded repeated training sequence includes a plurality of evenly spaced pilot tones.

52. The base station of claim 51 wherein the pilot tones are randomly phase modulated.

53. The base station of claim 49 wherein the dedicated pilot includes a set of pilot tones unique to the base station transmitting the signal.

54. The base station of claim 53 wherein the dedicated pilot includes two symbols, wherein the set of unique pilot tones are distributed across the two symbols according to an alternating pattern.

55. The base station of claim 54 wherein the set of unique pilot tones comprises multiple pairs of adjacent pilot tones and multiple single pilot tones alternately spaced within each symbol.

56. The base station of claim 49 wherein the signal comprises an OFDM signal.

57. The base station of claim 49 wherein the processor is further configured to synchronize a timing of the base station to that of one or more neighboring base stations based on the received synchronization data.

58. The method of claim 41 further comprising synchronizing a timing of the base station to that of one or more neighboring base stations based on the received synchronization data.

* * * * *